United States Patent [19]
Ettischer et al.

[11] 3,774,513
[45] Nov. 27, 1973

[54] DEVICE FOR PREVENTING FILM MOVEMENT IN CAMERAS

[75] Inventors: Helmut Ettischer, Ruit; Wolfgang Ort, Stuttgart-Bad; Horst Simon, Fellbach; Kurt Steisslinger, Stuttgart, all of Germany

[73] Assignee: Eastman Kodak Company, Rochester, N.Y.

[22] Filed: Aug. 21, 1972

[21] Appl. No.: 282,631

[52] U.S. Cl. .............................................. 95/31 FM
[51] Int. Cl. .......................................... G03b 19/04
[58] Field of Search ........................................ 95/31

[56] References Cited
UNITED STATES PATENTS
3,709,128   1/1973   Beach ............................... 95/31 FM Primary Examiner—John M. Horan
Attorney—W. H. J. Kline et al.

[57] ABSTRACT

A camera for roll film perforated at predetermined metering intervals includes a transport mechanism for advancing the film along an exposure plane and a metering mechanism having an inactive condition and an active condition for stopping film transport when the film is correctly positioned for exposure. A film sensing pawl is mounted for movement between a retracted position resting on the film surface, an extended position transversing the film while in a film perforation and a metering position spaced from the extended position in the direction of film advancement. A resilient force is selectively applied to the sensing member in a direction urging the sensing member from its metering position toward its extended position. The force on the sensing member is relieved at least during operation of the camera's exposure mechanism so that the force is not transmitted by the sensing member to the filmstrip.

7 Claims, 4 Drawing Figures

DEVICE FOR PREVENTING FILM MOVEMENT IN CAMERAS

CROSS-REFERENCE TO RELATED APPLICATION

Reference is made to commonly-assigned, copending U. S. Pat. application Ser. No. 203,524, entitled FILM METERING MECHANISMS FOR CAMERAS, and filed Dec. 1, 1971 in the name of David E. Beach.

BACKGROUND OF THE INVENTION

1. Field of the Invention

The present invention relates to cameras having means for detecting the presence of a film perforation to selectively lock and release the film transport mechanism, and more particularly to such cameras having means for minimizing any surge of force from the detecting means on the film during an exposure interval.

2. Description of the Prior Art

The present invention is an improvement over cameras of the type disclosed in copending, coassigned U. S. Pat. application Ser. No. 203,524, entitled "Film Metering Mechanism For Cameras" filed Dec. 1, 1971 in the name of David E. Beach. In the camera therein disclosed, a metering lever is movable between an inactive position and an active position disabling the camera's film transport mechanism. A film sensing pawl is mounted for movement from a retracted position engaging the film surface through an extended position transversing the film when intercepting one of the film perforations to a metering position spaced from the extended position in the direction of film advancement by the trialing edge of the perforation as the film is advanced. The film sensing pawl and the metering lever are associated such that the metering lever is moved to its active position upon movement of the sensing pawl to its metering position. A spring urges the sensing pawl from its metering position toward its extended position and, since the metering pawl remains in the film perforation during exposure, the spring force is applied also to the trailing edge of the film perforation. This force on the film is opposed by frictional forces between camera elements and between the film and camera and/or cartridge surfaces. When the shutter is tripped, minor vibrations travel through the camera. These vibrations may relieve static friction wherever it occurs within the camera. Loss of frictional forces restraining the film can cause the spring force on the film from the pawl to move the film during exposure.

SUMMARY OF THE INVENTION

It is an object of the present invention to reduce or eliminate the possibility of film movement during the exposure period by eliminating the force of the film sensing pawl on the trailing edge of the film perforation during a picture-take operation when the camera vibrations can suddenly relieve frictional restraints.

In a preferred embodiment of the present invention, this object has been accomplished by physically removing the spring which applies the force to the film sensing pawl from contact with the sensing pawl during the exposure period.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
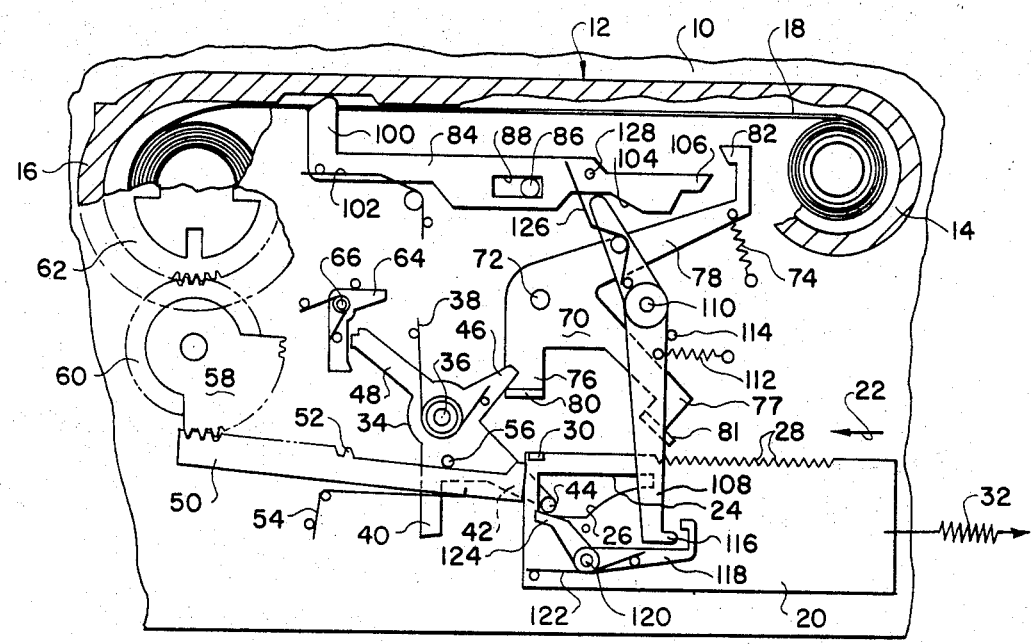
FIG. 1 is a view of a portion of a camera in accordance with the present invention and showing a cartridge containing a film strip loaded in the camera, the camera elements being shown in their positions immediately following an exposure.

Because cameras are well known, the present description will be directed in particular to elements forming part of, or cooperating more directly with apparatus in accordance with the present invention. It is to be understood that camera elements not specifically shown or described may take various forms well known to those skilled in the art.

Referring to the drawings, a camera having a housing 10 has been shown with a film cartridge 12 received therein. The film cartridge has supply and take-up chambers 14 and 16, respectively, which enter corresponding supply and take-up compartments in the camera housing. A filmstrip 18 is carried by the cartridge and is perforated along one edge at predetermined metering intervals. The cartridge may contain opaque backing paper, and may be of the type shown in coassigned U. S. Pat. No. 3,138,081 which issued on June 23, 1964 to Hubert Nerwin.

A film advance slide 20 is mounted in camera housing 10 so as to be movable from the position shown in FIG. 1 in the direction of arrow 22. Slide 20 has an opening 24 with a cam surface 26 formed thereby, a plurality of ratchet teeth 28 and a lug 30. A spring 32 urges slide 20 to the right as viewed in FIG. 1.

A shutter device member 34 is rotatably carried on a stud 36 in housing 10 and is biased in a clockwise direction as viewed in FIG. 1 by a spring 38. An arm 40 on drive member 34 actuates a shutter, not shown, during clockwise rotation of the drive member to effect an exposure. A second arm 42 of the drive member has a cam follower 44 extending into opening 24 of slide 20 to follow cam surface 26 during leftward movement of the slide, thereby rotating drive member 34 in a counterclockwise direction against the force of spring 38. The function of two other arms 46 and 48 on drive member 34 will be explained hereinafter.

A rack 50, having a plurality of gear teeth 52, is slidably mounted in housing 10 and is urged by a spring 54 into contact with a stud 56 on drive member 34. Teeth 52 mesh with corresponding gear teeth on a gear sector 58 which, through gears 60 and 62, advances film from supply compartment 14 to take-up compartment 16 when rack 50 is moved to the left. Gear sector 58 is connected to gear 60 thru a one-way clutch so that gears 60 and 62 do not turn when rack 50 is moved to the right.

Figure 2:
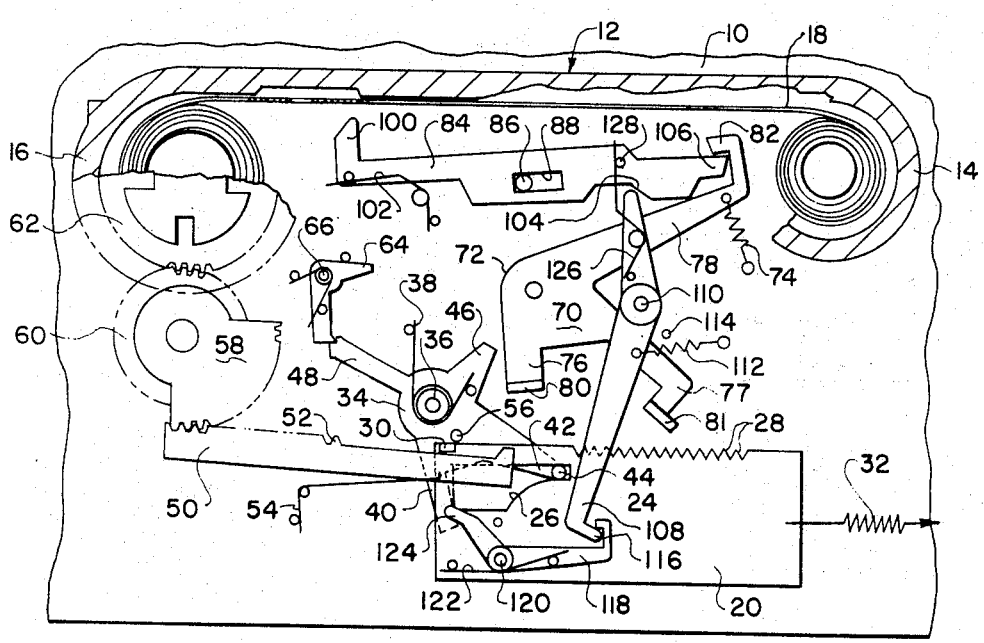
FIG. 2 is a view similar to FIG. 1 showing the camera elements in their position after the shutter has been cocked.
Figure 3:
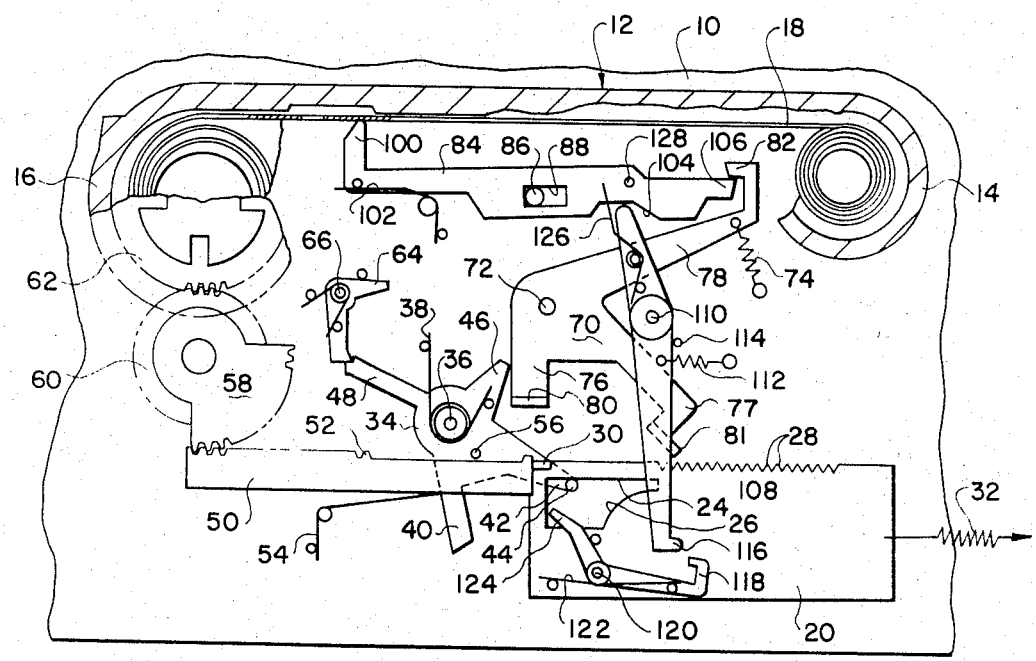
FIG. 3 is a view similar to FIG. 1 showing the camera elements preparatory to film advancement.
Figure 4:
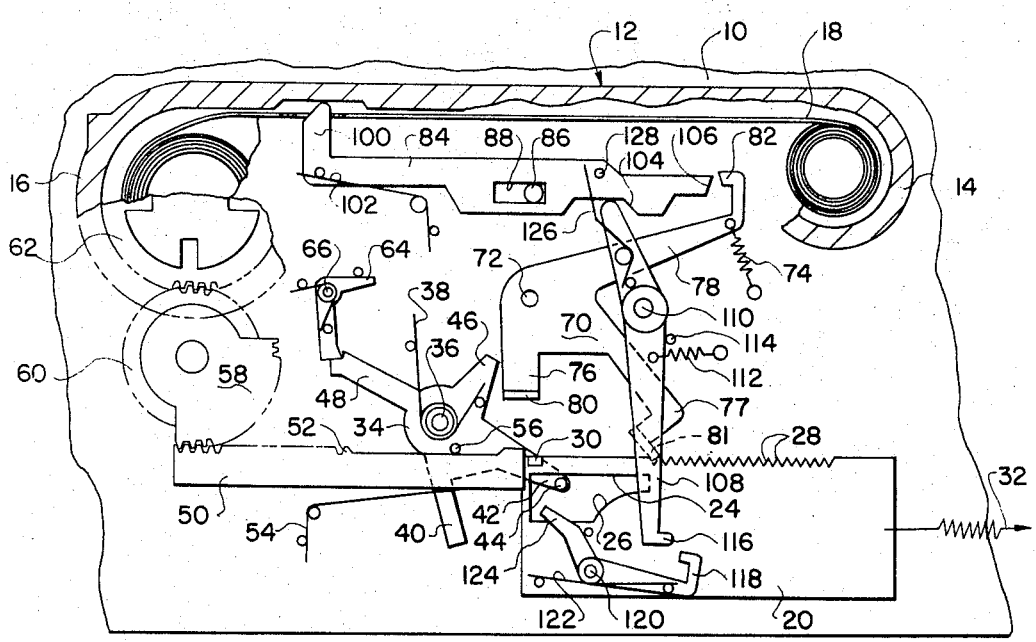
FIG. 4 is a view similar to FIG. 1 showing the camera elements in their positions when the camera is ready to be operated to make the exposure.

A latch member 64 is pivotally mounted in housing 10 on a stud 66 for movement between a latch position (retaining drive member 34 in its cocked position;

FIGS. 2–4) and a release position (permitting spring 38 to rapidly move the drive member to its uncocked position as shown in FIG. 1).

An intermediate member 70 is rotatably carried in housing 10 on a stud 72 and is biased in a clockwise direction by a spring 74. Member 70 has three arms 76–78 and three tabs 80–82 respectively on the end of those arms.

A film sensing member 84 is rotatably and slidably carried by a pin 86 which extends into slot 88 in the sensing member. A film sensing pawl 100 on the sensing member extends toward film 18 at the camera's exposure plane. A leaf spring 102 tends to rotate the sensing member in a clockwise direction to urge sensing pawl 100 to a film transversing position as shown in FIG. 1. A cam surface 104 and a tab 106 are provided on the other end of the sensing member, and the functions of these elements will be explained hereinafter.

A control member 108 is rotatably carried by a stud 110 and is urged in a counterclockwise direction by a spring 112 against a stop 114 on the camera housing. The upper portion of control lever 108 is positioned in the region of cam surface 104 of sensing member 84, while the lower portion of the control lever has tab 116 which lies in the path of a claw 118 which is rotatably carried by a stud 120 on slide 20 and which is urged in a clockwise direction about the stud by a spring 122 until leg 124 of the claw engages follower 44 of shutter drive lever 34. A wire spring 126 is aligned with a pin 128 on sensing member 84.

Operation

FIG. 1 shows the camera elements positioned after an exposure has been made. The camera is now ready for the operator to advance the film to the next picture frame. Referring to FIG. 2, the operator manually moves slide 20 to the left as viewed in that figure against the force of spring 32. As the slide moves to the left, follower 44 engages cam surface 26 causing shutter drive member 34 to rotate in a counterclockwise direction against the force of spring 38 until arm 48 thereon snaps behind latch member 64. At the same time, claw 118 engages tab 116 on control lever 108 to rotate the control lever in a clockwise direction, whereby the upper portion of the control lever engages cam surface 104 of film sensing member 84 to rotate the film sensing member in a counterclockwise direction withdrawing sensing pawl 100 from the film perforation. As control member 108 continues to rotate, spring 126 engages pin 128 to move sensing member 84 to the right until tab 106 thereon falls beneath tab 82 on intermediate member 70.

During the first stroke of slide 20, lug 30 misses rack 50 because the rack has been held in its lower FIG. 1 position by pin 56 on drive member 34. Therefore, during the first movement of the slide, there is no film advancement. The camera elements are now positioned as shown in FIG. 2, and, as the operator allows spring 32 to return slide 20 to the right, rack 50 is raised by spring 54 into alignment with abutment 30 on the slide. The camera elements are now in their respective positions shown in FIG. 3. Note that arm 42 and its cam follower 44 has released claw 118 so that the claw may be pivoted in a clockwise direction by spring 122 until it is no longer aligned with tab 116 of control member 108.

Now, on the second operational stroke of slide 20 in the direction of arrow 22, lug 30 on the slide moves rack 50 to the left to advance film from supply compartment 14 to take-up compartment 16 of the cartridge. As the film advances, when a perforation reaches the position of film sensing pawl 100, the pawl is moved into the perforation by spring 102 so that the sensing member is moved to the left by the advancing film. Note that at this time there is no spring force opposing such movement of the sensing member since spring 126 has been removed from pin 128 by spring 112.

At the moment that the next succeeding frame of film reaches the camera's exposure station, tab 106 on sensing member 84 falls off the tab 82 of intermediate member 70, enabling spring 74 to rotate the intermediate member in a clockwise direction until tab 81 on arm 77 engages ratchet teeth 28 on slide 20 to prevent further film advancement. When the operator releases slide 20, it is returned to the right by spring 32. The camera elements are now positioned as shown in FIG. 4 and the camera is ready to be operated to make an exposure. Note that spring 126 is spaced from pin 128 so that there is no force on the sensing member tending to move the sensing member to the right. Thus, when the shutter is tripped and camera vibrations are set up, there is no load on the film sensing pawl which might cause film movement toward the camera's supply chamber due to the loss of frictional resistance mentioned above.

To make an exposure, latch 64 is rotated in a clockwise direction (by the camera's body release lever, not shown), releasing drive member 34 to run down in a clockwise direction from its FIG. 1 position to operate the shutter mechanism by its arm 40. During such running down movement of drive member 34, its arm 46 engages tab 80 on arm 76 of intermediate member 70 to rotate the intermediate member in a counterclockwise direction, thereby removing tab 81 from ratchet teeth 28 of slide 20. At the same time, arm 42 of the drive member pivots claw 118 in a counterclockwise direction to align the right end of the claw with tab 116 of control lever 108, and pin 56 on the drive member moves rack 50 out of alignment with abutment 30 on the slide. Spring 102 retains sensing pawl 100 in the film perforation. The camera elements are now in their respective positions shown in FIG. 1, and the camera is ready to be operated to advance the next succeeding film frame to the exposure station as hereinbefore described.

The invention has been described in detail with particular reference to a preferred embodiment, but it will be understood that variations and modifications can be effected within the spirit and scope of the invention.

We claim:

1. In a camera having (1) supply and take-up chambers for receiving respectively supply and take-up rolls of a filmstrip perforated at predetermined metering intervals; (2) transport means operable to advance a received filmstrip along a camera exposure plane from said supply chamber to said take-up chamber, (3) an exposure mechanism operable to effect the exposure of received filmstrip at the exposure plane; (4) a metering mechanism having an active condition disabling said transport means and an inactive condition, (5) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement; (6) means associated with said sensing member and said metering mechanism for placing said metering mechanism in its active condition upon movement of said sensing member to its metering position; and (7) means for applying a force to said sensing member, said force having a direction urging said sensing member from its metering position toward its extended position; the improvement comprising means associated with said force applying means for selectively removing said force from said sensing member at least during operation of said exposure mechanism, whereby such force is not transmitted by said sensing member to a received filmstrip during exposure.

2. In a camera having (1) supply and take-up chambers for receiving respectively supply and take-up rolls of a filmstrip perforated at predetermined metering intervals; (2) transport means operable to advance a received filmstrip along a camera exposure from said supply chamber to said take-up chamber; (3) an exposure mechanism operable to effect the exposure of received filmstrip at the exposure plane; (4) a metering mechanism having an active condition disabling said transport means and an inactive condition, (5) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement; and (6) means associated with said sensing member and said metering mechanism for placing said metering mechanism in its active condition upon movement of said sensing member to its metering position; the improvement comprising:

means, including a control member movable toward and away from a predetermined position, for moving said sensing member in a direction along the exposure plane opposed to the direction of film advancement only when said control member is moved away from its predetermined position; and means for locating said control member at its predetermined position at least during operation of said exposure mechanism.

3. The improvement as defined in claim 2 further comprising means associated with said sensing member and said control member for moving said sensing member from its metering position to its retracted position upon movement of said control member from its predetermined position.

4. The improvement as defined in claim 3 wherein said last-mentioned means includes a cam surface on said sensing member contactable by said control member.

5. The improvement as defined in claim 2 further comprising means associated with said control member and said transport means for moving said control member from its predetermined position upon intial operation of said transport means.

6. The improvement as defined in claim 2 further comprising spring means for urging said sensing member from its retracted position toward its extended position.

7. In a camera having (1) supply and take-up chambers for receiving respectively supply and take-up rolls of filmstrip perforated at predetermined metering intervals; (2) transport means operable to advance a received filmstrip along a camera exposure plane from said supply chamber to said take-up chamber; (3) a shutter mechanism movable from a cocked position to a run-down position to effect the exposure of received filmstrip at the exposure plane; (4) cocking means operable to move said shutter mechanism to its cocked position; (5) a metering mechanism having an active condition disabling said transport means and an inactive condition; (6) a film sensing member movable from a retracted position on one side of said exposure plane to an extended position transversing said exposure plane when intercepting one of the perforations of a received filmstrip, and, by the trailing edge of the perforation as the received filmstrip is advanced, to a metering position spaced from said extended position in the general direction of filmstrip advancement; and (7) means associated with said sensing member and said metering mechanism for placing said metering mechanism in its active condition upon movement of said sensing member to its metering position; the improvement comprising:

a control member movable toward and away from a predetermined position;

spring means associated with said control member in a manner to be operatively coupled to said sensing member for urging said sensing member in a direction along the exposure plane opposed to the direction of film advancement when said control member is moved away from its predetermined position and to be uncoupled from said sensing member when said control member is in its predetermined position;

means for moving said control member to its predetermined position at least during run-down movement of said shutter mechanism; and means associated with said cocking means for moving said control member from its determined position upon operation of said cocking means.

* * * * *

PO-1050
(5/69)

UNITED STATES PATENT OFFICE
CERTIFICATE OF CORRECTION

Patent No. 3,774,513          Dated November 27, 1973

Inventor(s) Ettischer, Ort, Simon and Steisslinger

It is certified that error appears in the above-identified patent and that said Letters Patent are hereby corrected as shown below:

[30], Front Page,    --Foreign Application Priority Data
                 October 14, 1971      Germany    G 71 38 893.7--

Signed and sealed this 17th day of September 1974.

(SEAL)
Attest:

McCOY M. GIBSON JR.                 C. MARSHALL DANN
Attesting Officer                   Commissioner of Patents